US007347923B2

(12) United States Patent
Cummings et al.

(10) Patent No.: US 7,347,923 B2
(45) Date of Patent: Mar. 25, 2008

(54) DIELECTROPHORESIS DEVICE AND METHOD HAVING INSULATING RIDGES FOR MANIPULATING PARTICLES

(75) Inventors: Eric B. Cummings, Livermore, CA (US); Gregory J. Fiechtner, Livermore, CA (US)

(73) Assignee: Sandia Corporation, Livermore, CA (US)

( * ) Notice: Subject to any disclaimer, the term of this patent is extended or adjusted under 35 U.S.C. 154(b) by 183 days.

(21) Appl. No.: 10/678,603

(22) Filed: Oct. 3, 2003

(65) Prior Publication Data

US 2005/0072676 A1 Apr. 7, 2005

(51) Int. Cl.
*G01N 27/447* (2006.01)
*G01N 27/453* (2006.01)

(52) U.S. Cl. ....................... 204/547; 204/643; 204/458

(58) Field of Classification Search ................ 204/547, 204/549, 643, 645, 458, 609

See application file for complete search history.

(56) References Cited

U.S. PATENT DOCUMENTS 5,427,663 A 6/1995 Austin et al. ............ 204/180.1
5,454,472 A 10/1995 Benecke et al. ......... 209/127.1
5,858,192 A 1/1999 Becker et al.
6,071,394 A 6/2000 Cheng et al.
6,264,815 B1 7/2001 Pethig et al.
6,310,309 B1 10/2001 Ager et al.
6,368,871 B1 * 4/2002 Christel et al. ............. 436/180
6,596,143 B1 7/2003 Wang et al.
6,641,708 B1 11/2003 Huang et al. ............... 204/547
6,685,810 B2 2/2004 Noca et al. ................. 204/450
6,685,841 B2 2/2004 Lopez et al. ................ 210/767
6,749,736 B1 * 6/2004 Fuhr et al. .................. 204/643
6,824,664 B1 * 11/2004 Austin et al. ............... 204/643
6,875,329 B2 * 4/2005 Washizu et al. ............ 204/547
6,881,315 B2 * 4/2005 Iida et al. .................... 204/600
7,014,747 B2 3/2006 Cummings et al. ......... 204/643
2002/0175079 A1 11/2002 Christel et al.
2003/0010637 A1 1/2003 Cummings
2004/0026250 A1 2/2004 Cummings et al.
2004/0211669 A1 10/2004 Cummings et al. ......... 204/547
2004/0226819 A1 11/2004 Talary et al. ............... 204/451

OTHER PUBLICATIONS

Fiechtner et al., "Faceted Design of Channels for Low-Dispersion Electrokinetic Flows in Microfluidic Systems", Analytical Chemistry, 2003, 75(18):4747-4755.

Huang et al., "Introducing Dielectrophoresis as a New Force Field for Field-Flow Fractionation", Biophysical Journal, Aug. 1997, 73:1118-1129.

Pohl, "The Motion and Precipitation of Suspensoids in Divergent Electric Fields", Journal of Applied Physics, Jul. 1951, 22(7):869-871.

Yang et al, "Cell Separation on Microfabricated Electrodes Using Dielectrophoretic/Gravitational Field-Flow Fractionation", Anal. Chem., 1999, 71:911-918.

* cited by examiner

*Primary Examiner*—Alex Noguerola
(74) *Attorney, Agent, or Firm*—Dorsey & Whitney LLP

(57) ABSTRACT

Embodiments of the present invention provide methods and devices for manipulating particles using dielectrophoresis. Insulating ridges and valleys are used to generate a spatially non-uniform electrical field. Particles may be concentrated, separated, or captured during bulk fluid flow in a channel having insulating ridges and valleys.

30 Claims, 6 Drawing Sheets

DIELECTROPHORESIS DEVICE AND METHOD HAVING INSULATING RIDGES FOR MANIPULATING PARTICLES

STATEMENT REGARDING FEDERALLY-FUNDED RESEARCH

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

TECHNICAL FIELD

The present invention relates to manipulation of particles, and more particularly, to dielectrophoresis.

BACKGROUND OF THE INVENTION

Dielecrophoresis (DEP) is the motion of particles caused by the effects of conduction and dielectric polarization in non-uniform electric fields. Unlike electrophoresis, where the force acting on a particle is determined by its net charge, the dielectrophoresic force depends on the geometrical, conductive, and dielectric properties of the particle. A complex conductivity of a medium can be defined as $\sigma^*=\sigma+i\omega\epsilon$, where $\sigma$ is the real conductivity and $\epsilon$ is the permittivity of the medium, i is the square root of −1, and $\omega$ is the angular frequency of the applied electric field, E. According to well-known theory, the dielectrophoretic force is proportional to the differences in complex conductivity of the particle and suspending liquid and square of the applied electric field. Without being bound by theory, for a spherical particle of radius r, the DEP force, $F_{DEP}$ is given by $$F_{DEP}=2\pi r^3\epsilon_m \mathrm{Re}[f_{CM}]\nabla E^2$$

where $\epsilon_m$ is the absolute permittivity of the suspending medium, E is the local (rms) electric field, $\nabla$ is the del vector operator and $\mathrm{Re}[f_{CM}]$ is the real part of the Clausius-Mossotti factor, defined as:

$$f_{CM}=\frac{\sigma_p^*-\sigma_m^*}{\sigma_p^*+2\sigma_m^*}$$

where $\sigma_p^*$ and $\sigma_m^*$ are the complex conductivities of the particle and medium respectively, as described in M. P. Hughes, et. al. *Biochimica et Biophysica Acta* 1425 (1998) 119-126, incorporated herein by reference. Depending on the conductivitiess of the particle and medium, then, the dielectrophoretic force may be positive (positive DEP), or negative (negative DEP).

Thus, when a dielectric particle is exposed to an electric field, it conducts and polarizes. The size and direction of the induced electric current and dipole depend on the frequency of the applied field and electrical properties of the particle and medium, such as conductivity, permittivity, morphology and shape of the particle. Typically in an inhomogeneous field, this causes a force due to the interaction of the induced dipole and the electric field. Particles may also be moved in electric fields due to a gradient in the field phase (typically exploited in electrorotation and traveling wave dielectrophoresis), see for example Pohl H. A., *J. Appl. Phys.,* 22, 869-871; Pohl, H. A., *Dielectrophoresis*, Cambridge University Press; Huang Y., R. C. Gascoyne et al., Biophysical Journal, 73, 1118-1129; Wang X. B., Gascoyne, R. C., *Anal. Chem.* 71, 911-918, 1999; and U.S. Pat. No. 5,858,192, all of which are hereby incorporated by reference.

Typical devices and methods employing dielectrophoresis to manipulate particles employ electrodes shaped or arranged to generate a spatially non-uniform electric field, and therefore dielectrophoretic forces. Particles are generally drawn toward the electrode edges, or toward electric field minimums between electrode regions. This limits the particles to be manipulated to those that are compatible with the electrodes, electrode materials, electrochemical products, and sharp electric field gradients in the immediate vicinity of the electrodes.

Further, typical devices exploiting dielectrophoresis are designed to concentrate particles in one or more particular regions. Accordingly, the devices can sequentially concentrate and move bulk fluid through the system. The amount of sample fluid to be moved through the device is limited by the amount of particles that can be concentrated at a particular place without obstructing the bulk fluid flow.

There is therefore a need for devices and methods for manipulating particles using dielectrophoresis in a continuous flow system without plugging or fouling the devices. Such as system would preferably not be limited to the use of particular electrode shapes or arrangements to generate the non-uniform fields used in dielectrophoresis.

SUMMARY OF THE INVENTION

A device for manipulating particles using dielectrophoresisis is provided. A plurality of electrodes are positioned to generate an spatially non-uniform electric field across an insulating ridge. A plurality of the insulating ridges may be provided, and the ridges and substrate may form a wall of a channel. The insulating ridge is contacted with a sample fluid flowing through the channel. The spatially non-uniform electric field exerts a dielectrophoretic force on particles in the sample fluid, thereby constraining motion of at least one particle, and the particles are transported along the ridge.

DETAILED DESCRIPTION OF PREFERRED EMBODIMENTS

Figure 1:
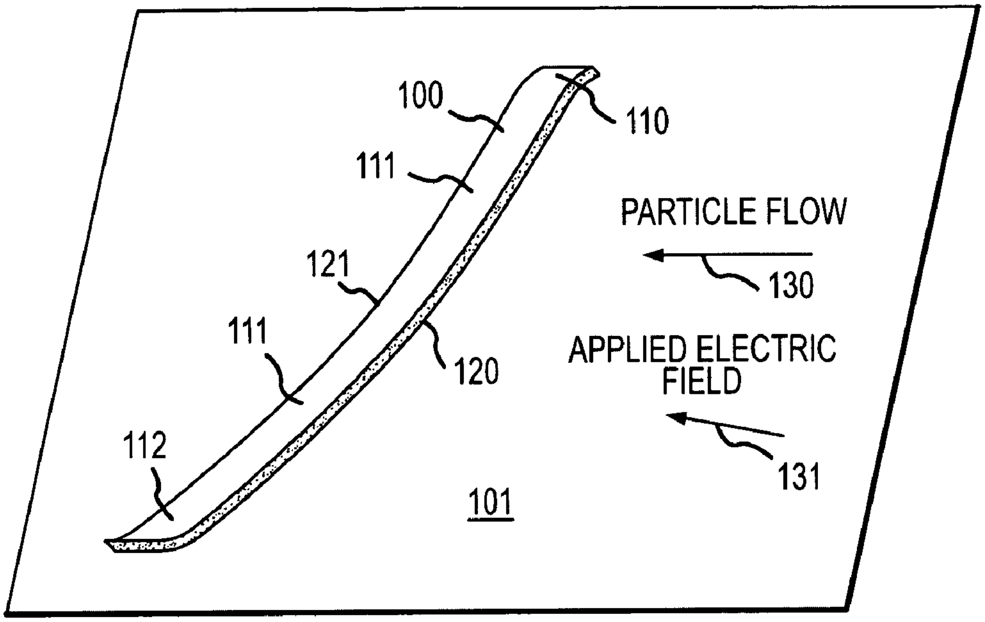
FIG. 1 depicts an embodiment of a device according to the present invention having a ridge on a substrate.

Embodiments of the present invention provide methods and devices for manipulating particles using dielectrophoresis. The manipulations may include but are not limited to, concentrating, transporting, filtering, capturing (trapping), and/or dispersing, as described further below.

Particles manipulated in accordance with embodiments of the invention may include biological or non-biological particles, generally ranging in size from 5 nm to 200 μm in diameter. However, smaller and larger particles may also be manipulated in some embodiments depending on the strength of the applied electric field, the magnitude of gradients of the electric field, and the conductivity and permittivity of the particle and the fluid, as described further below. Further, particles may have generally any shape. Manipulated particles include generally any particle conducting or forming a dipole in response to an applied electric field that is different from that of the displaced fluid. In some embodiments, however, target particles are attached to other particles so to alter their dielectrophoretic behavior, e.g., to reduce the field or field gradients needed to manipulate the target particles.

Suitable particles include, but are not limited to, large chemical molecules, in some embodiments generally molecules larger than about 10 kD, although in some embodiments smaller molecules are manipulated depending on the strength of the applied electric field, geometry of the device, and composition of the carrier fluid, described further below. Suitable molecules include environmental, clinical chemicals, pollutants, toxins, and biomolecules, including, but not limited to, pesticides, insecticides, toxins (including biotoxins), therapeutic and abused drugs, hormones, antibiotics, antibodies, organic materials, etc. Suitable biomolecules include, but are not limited to, proteins (including enzymes, immunoglobulins and glycoproteins), nucleic acids, lipids, lectins, carbohydrates, hormones, whole cells (including procaryotic (such as pathogenic bacteria) and eucaryotic cells, including mammalian tumor cells), viruses, spores, amoeba, yeasts, etc.

Particles manipulated by embodiments of the present invention may further include particles sampled from air or other gaseous samples, including for example, dirt, diesel soot, dust, pollens, rubber particles, or any other particle collected from a gas sample.

In some embodiments, manipulated particles include a protein or proteins. By "proteins" or grammatical equivalents herein is meant proteins, oligopeptides and peptides, derivatives and analogs, including proteins containing non-naturally occurring amino acids and amino acid analogs, peptidomimetic structures, multiple-protein structures, enzymes, and any other particle that is now or subsequently recognized as being a protein.

In some embodiments, the manipulated particles include nucleic acids. By "nucleic acid" or "oligonucleotide" or grammatical equivalents herein means at least two nucleotides covalently linked together. A nucleic acid of the present invention will generally contain phosphodiester bonds, although in some cases, as outlined below, nucleic acid analogs are included that may have alternate backbones. As will be appreciated by those in the art, all of these nucleic acid analogs may find use in the present invention. In addition, mixtures of naturally occurring nucleic acids and analogs can be made; alternatively, mixtures of different nucleic acid analogs, and mixtures of naturally occurring nucleic acids and analogs may be made. The nucleic acids may be single stranded or double stranded, as specified, or contain portions of both double stranded or single stranded sequence. The nucleic acid may be DNA, both genomic and cDNA, RNA or a hybrid, where the nucleic acid contains any combination of deoxyribo- and ribo-nucleotides, and any combination of bases, including uracil, adenine, thymine, cytosine, guanine, inosine, xathanine hypoxathanine, isocytosine, isoguanine, etc.

Suitable particles for manipulation include biomolecules associated with: viruses, bacteria, amoeba, enzymes, carbohydrates and lipids.

Other suitable particles include but are not limited to magnetic particles, high-magnetic-permeability particles, metal ions, metal ion complexes, inorganic ions, inorganic ion complexes, organometallic compounds and inorganic compounds, particularly heavy and/or toxic metals, including but not limited to, aluminum, arsenic, cadmium, chromium, selenium, cobalt, copper, lead, silver, nickel, or mercury.

In preferred embodiments, the manipulated particle comprises a biotoxin. As will be appreciated by those in the art, there are a large number of possible biotoxins that may be identified using embodiments of the present invention, including, but not limited to, ricin, botulinum toxin, tetanus toxin, cholera toxin, abrin, aflotoxins, and conotoxins.

In preferred embodiments, the manipulated particle comprises a weapon degradation product. Degradation products that may be identified using embodiments of the present invention include, but are not limited to, alkylphosphonic acids and related monoesters.

In preferred embodiments, the manipulated particle comprises an explosive. Explosives that may be identified using embodiments of the present invention include, but are not limited to, RDX, HMX, tetryl, trinitrotoluene, other nitrotoluenes and nitroaramines.

Particles to be manipulated in accordance with embodiments of the present invention are generally suspended in a fluid. Fluid samples containing particles and useful with embodiments of the present invention may include substantially any liquid compatible with the particle of interest. Water, including deionized water, or buffer fluids are used in some embodiments. In some embodiments, a biological fluid sample is used such as bodily fluids including blood, urine, saliva or perspiration. In some embodiments, the fluid sample is mixed with additives, such as chelating molecules, growth media, pH buffering molecules, surfactant molecules, oils, and/or solvents, to alter the physical, chemical and electrical properties of the fluid, to make the fluid more benign to living organisms, to prevent aggregation and sticking of the particles to each other and surfaces, etc. As will be appreciated by those in the art, the sample fluid may comprise any number of things, including, but not limited to, bodily fluids (including, but not limited to, blood, urine, serum, lymph, saliva, anal and vaginal secretions, perspiration and semen; and solid tissues, including liver, spleen, bone marrow, lung, muscle, brain, etc.) of virtually any organism, including mammalian samples; environmental samples (including, but not limited to, air, agricultural, water and soil samples); biological warfare agent samples; research samples (e.g., in the case of nucleic acids, the sample may be the products of an amplification reaction; or in the case of biotoxins, control samples, for instance; purified samples, such as purified genomic DNA, RNA, proteins, etc.; raw samples (bacteria, virus, genomic DNA, etc.). As will be appreciated by those in the art, virtually any experimental manipulation may have been done on the sample prior to its use in embodiments of the present invention. For example, a variety of manipulations may be performed to generate a liquid sample of sufficient quantity from a raw sample. In some embodiments, gas samples and aerosol samples are passed through a collector to generate a liquid sample containing particles present in the original sample. In this manner, environmental sampling of gas and/or aerosols may be used. In some embodiments, a liquid may be contacted with a solid sample to disperse the target analyte into the liquid for subsequent analysis. Other fluids of interest include, for example, carbonated beverages, juices, blood, blood serum, fresh water, salt water, sea water, petroleum, and various fermentation broths.

FIG. 1 depicts an embodiment of a device according to the present invention including a ridge 100 formed on a substrate 101. The term "ridge", as used herein, generally refers to a region of height difference on a substrate. Therefore, "ridge" or "ridges", as used herein may be either a protruding or depressed region of the substrate, including a valley, for example. Ridges are also sometimes referred to as obstacles herein. The substrate 101 may be made of any of a variety of substantially low-conductivity materials or materials that are bounded by a low-conductivity coating in the region of the ridges. Suitable substrate materials include, but are not limited to, silicon, silicon dioxide, alumina, boron nitride, silicon nitride, diamond glass and fused silica, gallium arsenide, germanium, indium phosphide, III-V materials, PDMS, SU-8, silicone rubber, aluminum, ceramics, polyimide, quartz, plastics, resins and polymers including polymethylmethacrylate, acrylics, polyethylene, polyethylene terepthalate, polycarbonate, polystyrene and other styrene copolymers, polypropylene, polytetrafluoroethylene, superalloys, zircaloy, steel, gold, silver, copper, tungsten, molybdeumn, tantalum, SU-8, ZEONOR, TOPAZ, KOVAR, KEVLAR, KAPTON, MYLAR, teflon, etc. High quality glasses such as high melting borosilicate or fused silicas may be preferred for their UV transmission properties. Insulating materials or coatings are preferred for the substrate 101. In the case where conducting materials are used for the substrate 101, the conducting materials are preferably coated with an insulating material.

In some embodiments the ridge 100 is made from the same material as the substrate 101. In some embodiments, however, the ridge 100 is made of a different material deposited or adhered to the substrate 101. The ridge 100 may generally be formed of any of the above-listed materials or of some other material. In preferred embodiments, the ridge 100 is an insulating ridge, made entirely from insulating materials or simply coated with an insulating material. In other preferred embodiments, the ridge 100 is a valley, or negative ridge whose side walls are insulating materials. The negative ridge can be constructed by removing material from a substrate or applying material in regions around the ridge. More generally, as used herein, ridge generally refers to any difference in height along a substrate sufficient to generate a spatially non-uniform field useful for dielectrophoresis, as described further below. Depending on the sign of the difference, the ridges may be "ridges" or "valleys" in accordance with common usage of the terms. Accordingly, "ridge" includes a localized step in a substrate height as well as a valley or depression in a substrate. A positive ridge locally concentrates and a valley, or negative ridge, locally rarefies an applied electric field, generating non-uniformities in the field that induce dielectrophoretic forces on particles. Embodiments of ridges useful in the present invention have heights that span a small fraction (e.g., 0.001%) of the height of the fluid on the substrate, in which case the induced field concentration is localized near the surface, to a large fraction (e.g., 99.999% of the height of the liquid in the channel, in which case the electric field concentration is extreme and less localized. The typical useful range is more moderate, e.g., 10% to 90%, for ease in fabrication, prevention of unwanted dispersion and dead volume. The same considerations hold for the depth of valleys. The absolute height of ridges and layer of fluid surrounding the valleys should be sufficiently large to permit at least constrained passage of particles over the ridge to avoid mechanical filtering or clogging. A typical minimum height of the fluid within the device is one to ten diameters of the maximum particle diameter, with larger ratios better for resisting clogging. The width of the ridge can generally be much smaller than the ridge height (e.g., 0.1%) to much larger than the ridge height (e.g., 1000 times). Again, the typical range is generally smaller than this general range. Fabrication economy generally favors ridges having a width that is more than ~10% of the depth change. Power efficiency and device size favors ridges having widths that are less than ~100 times the depth change. For very shallow channels (e.g., nanometer-scale depths) resolution considerations may supercede efficiency and device concerns to favor ridges having larger relative widths. A preferred design methodology is to scale the devices in proportion to the average particle size. For bacteria (e.g., ~1 μm characteristic size), typical minimum fluid depths in the shallow regions about the ridges are in the range 1 to 200 μm, typical fluid depths in the deep regions about the ridges are in the range 1.5 to 2000 μm. Typical ridge widths are in the range 100 nm to 10 mm. Typical ranges of dimensions for viruses are ~30 times smaller than these dimensions. Typical ranges for eukaryotic cells are ~4 times larger than these dimensions. Geometries to processes algae and amoeba are typically ~50 times larger than these dimensions. These general ranges are sufficiently broad to support processing of a wide range of particle sizes by devices fabricated simultaneously on the same substrate. These ranges are offered only for practical guidelines and are not be limited by any of the flow or transport physics. The actual dimensions of ridges depends on the fabrication technique, particle size, and many other application-specific constraints.

In preferred embodiments of the present invention, the ridge 100 is positioned at an angle with respect to particle flow, shown in FIG. 1 as a flow direction 130. The ridge 100 is preferably positioned at an angle from about 20 degrees to about 80 degrees with respect to the flow direction 130, however in some embodiments a larger or smaller angle may be used, including perpendicular to the fluid flow 130. In one preferred embodiment, the ridge 100 is oriented at a 45 degree angle with respect to the particle flow 130.

An electric field is applied across the ridge 100. Although not explicitly shown in FIG. 1, a plurality of electrodes are provided to generate the electric field. The electrodes may be an integral part of the device, for example, formed on the substrate 101, or may be part of an external device positioned to generate an electric field across the ridge 100. The electric field is applied in a direction at an angle to the particle flow 130 in some embodiments, although in some embodiments the electric field may be applied parallel to the particle flow 130. In the embodiment shown in FIG. 1 the electric field is applied in an electric field direction 131, having an offset angle from the particle flow direction 130. In some embodiments, the applied electric field 131 is also used to electrokinetically transport particles. In those embodiments, the electric field 131 is applied in the direction of intended electrokinetic transport. The particular electric field strengths used depend on the particles to be manipulated, the applied field frequency components, and the particle-bearing fluid. For example, in some embodiments where anthrax or *E. coli* are manipulated in de-ionized water, a zero-frequency (direct-current or DC) field strength of a few hundred Volts to a few thousand Volts across 12.5 mm immobilizes the particles against electrokinetic flow on ridges having a characteristic dimension of ~100 μm.

Generally, the ridge 100 concentrates the applied electric field so that particles having a negative dielectrophoretic mobility experience a repulsive dielectrophoretic force from the ridge 100 at a leading edge 120. At a trailing edge 121, particles having a positive dielectrophoretic mobility experience an attractive dielectrophoretic force to the ridge 100. Conversely, a negative ridge, or valley, rarefies the applied electric field to that particles having a positive dielectrophoretic mobility experience an attractive force toward the leading edge 120 while particles having a negative dielectrophoretic mobility experience a repulsive force from the trailing edge 121. When the dielectrophoretic forces are strong enough to inhibit motion across the ridge 100, which may be driven by any of a variety of mobilization forces, including electrokinetic, gravitational, pressure, and magnetic forces, the particles flow along the leading edge 120 or the trailing edge 121. Accordingly, particles are concentrated at the ridge in accordance with some embodiments, and transported along the ridge.

Although a single ridge is shown in FIG. 1, embodiments of the present invention include a plurality of ridges, sometimes referred to as a "corduroy" pattern, or "corduroy ridge" or "corduroy ridges". The spacing between ridges is uniform, in some embodiments, and non-uniform in others. In one preferred embodiment the spacing between ridges is large compared to the width of the ridges, e.g., 2 to >10 times the ridge widths. In this limit the ridges affect particles substantially the same as they do in the absence of other ridges, substantially uncoupling the ridge function and dramatically simplifying the design. In another preferred embodiment, the average fraction of the surface occupied by ridges is kept substantially constant in the direction/plane normal to the applied electric field. This minimizes or reduces gradients in the channel conductance normal to the applied electric field that can significantly change the direction and magnitude of the electric field across the surface and complicate designs by coupling the behavior of one region of the pattern to that of a remote region. Yet another preferred embodiment keeps the average fraction of the surface occupied by the ridges substantially constant throughout bulk regions of the device, with field-wise gradients in this average fraction only in optional transition regions at the start and/or stop of the device and in between these uniform regions. This practice maintains constant average applied electric fields in each region of the device that has a constant average ridge fraction.

The ridge 100 shown in FIG. 1 further includes a leading terminus 110 and a trailing terminus 112. The leading terminus 110 and trailing terminus 112 are optional, however they are advantageously included in embodiments of the invention to transport particles in a particular direction, for example, as they move along the ridge 100. For example, in some embodiments the leading terminus 110 and/or the trailing terminus 112 are provided to transport particles toward a concentration region, or to increase the dielectrophoretic force felt at one edge of the ridge 100.

The dielectrophoretic behavior of the leading terminus 110 of the ridge 100 depends on the local angles of the leading terminus 110. The ridge 100 can terminate abruptly, in a tapered manner, at a straight channel boundary, or at a contoured channel boundary. Typically, the leading terminus 110 is provided to prevent unwanted particle leakage or unwanted particle immobilization.

An abrupt leading terminus 110 substantially aligned with the local applied electric field is shown in FIG. 1. The leading terminus 110 reduces trapping along the abrupt terminal edge by gradually reducing the angle with respect to the applied electric field. To reduce the risk of unwanted trapping in the region near the leading terminus 110, in embodiments of the invention the leading edge 120 and/or the trailing edge 121 near the terminus 110 are tapered so that the incidence angle at the tip is higher than in the central section of the ridge 100.

A tapered termination may be preferred for ease of fabrication in some embodiments. If preventing particle immobilization is a concern, both the leading edge 120 and trailing edge 121 near the terminus 110 should be curved so the incidence angles are generally higher than in the central section.

In some embodiments, the ridge 100 is connected to a straight channel wall. Termination at a wall helps to prevent unwanted leakage of particles, in some embodiments. Terminating an angled ridge at a straight wall generates electric field gradients that could produce unwanted leakage or trapping in some embodiments. These effects can be minimized by minimizing the width of the corduroy ridge.

In some embodiments, the channel wall can be contoured to accommodate the corduroy ridge and minimize electric field gradients.

Figure 2:
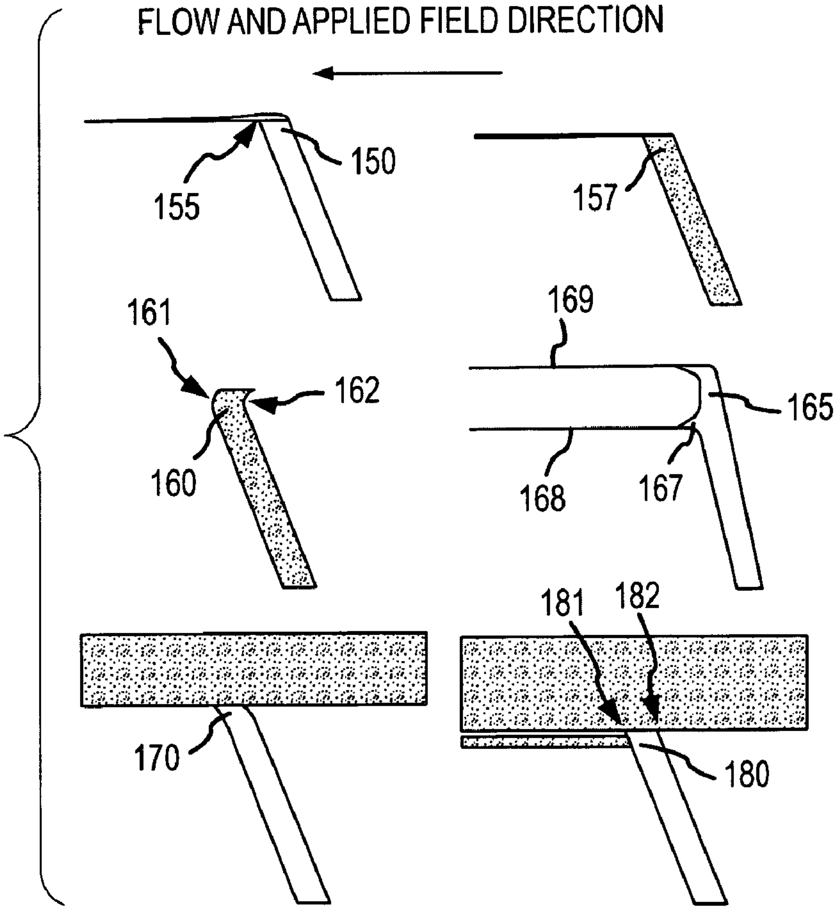
FIG. 2 depicts embodiments of termini for ridges, according to embodiments of the present invention.

The trailing terminus 112 generally has similar structure to that described for leading terminus 110. FIG. 2 depicts several embodiments of the trailing terminus 112. A simple terminus 150 shown for the ridge 100 in FIG. 2 will either trap particles at the trailing edge as indicated by an arrow 155 or allow particles to spill, depending on the applied field and ridge incidence angle. A "spillway" 157 terminus allows particles of both DEP mobility signs to be released from the ridge; a "trap" terminus 160 collects particles having positive and negative DEP mobility in regions 161 and 162, respectively for a positive ridge. A "divided spillway" terminus 165 separates particles having positive and negative DEP mobility by means of a "spur" 167 to separate streams 168 and 169 respectively. Other embodiments provide terminations that treat particles differently by the sign of their DEP mobility. In some embodiments, a corduroy ridge slopes toward and is terminated at a wall 170 to spill the particles along the wall 170. In some embodiments, a corduroy ridge slopes toward and is terminated at a wall 170 to spill the particles along the wall 170; in other embodiments, a ridge is terminated more abruptly at a wall 180 and traps particles in the regions 181 and 182 near the wall; in more general embodiments, the geometry of the termination is otherwise contoured to collect and release particles as needed for the application.

More than one ridge as described above can be intersected or joined to create a "compound" ridge. For example, a ridge having a spillway in the center can be constructed by stacking two ridges, one of which has a spillway termination, etc. The "divided" spillway 165 can be considered such a compound ridge, as are others described in the embodiments below.

In embodiments of the present invention, particles are both manipulated using dielectrophoresis and transported using a "mobilization field". Generally, as used herein, dielectrophoretic forces tend to draw particles into and/or confine particles to dielectrophoretic potential wells and/or repel particles from dielectrophoretic potential barriers while "mobilization fields" tend to move the particles through the system with a bulk flow. Depending on the competing transport mechanism, the mobilization field can be an electric field in the case of electrokinesis, a pressure field in the case of advection, an inertial or gravitational force field in the case of sedimentation or buoyancy, a magnetic field in the case of magnetophoresis, or a combination of these fields. No distinction need be made between an electric field that drives electrokinesis and dielectrophoresis except that the field waveform preferably has a spectral component near-zero-frequency (DC) to produce a significant particle displacement by electrokinesis.

Without being bound by theory, a brief description of the equations describing motion of particles in embodiments of the invention is provided to facilitate further understanding of embodiments of the invention. The description uses a coordinate system {x, y, z} in which the corduroy ridges are given as channel depth changes in the z-direction that run parallel to the y-direction (normal to the x-direction) in the region of interest. Although these features may curve in the {x,y} plane, for the purpose of the exemplary equations of motion the radius of curvature is assumed to be large enough that angular changes are negligible over the region of interest, approximately one corduroy wavelength in x and y.

Accordingly, in embodiments of the invention the dielectrophoretic potential, $\Phi_{DEP}$ is given by $\Phi_{DEP}=-\alpha/2\ E\cdot E$, where $\alpha$ is the particle polarizability. The dielectrophoretic force is the negative gradient of this potential:

$$F_{DEP}=\alpha/2\nabla(E\cdot E)=\alpha E\cdot\nabla E. \tag{1}$$

The dielectrophoretic mobility of a particle $\mu_{DEP}$ can be defined as $u_{DEP}=\mu_{DEP}\ \nabla(E\cdot E)$. Then, for a particle having a diffusivity D at temperature T, $\mu_{DEP}=\alpha D/(2\ kT)$ or $\alpha=2\ kT\ \mu_{DEP}/D$.

If we assume a form for the electric potential, $\phi$, such that $$\phi=E_x\phi_0(x,z)+E_y y \tag{2}$$

then the electric field is given by $$E=\nabla\varphi=E_x\frac{\partial\varphi_0}{\partial x}e_x+E_y e_y+E_x\frac{\partial\varphi_0}{\partial z}e_z \tag{3}$$

As noted above for conditions of ideal electrokinetic flows, the potential $\phi$ satisfies the Laplace equation, $\nabla^2\phi=0$, such that $$\frac{\partial^2\varphi_0}{\partial z^2}=-\frac{\partial^2\varphi_0}{\partial x} \tag{4}$$

and $$\nabla E=E_x\begin{bmatrix}\frac{\partial^2\varphi_0}{\partial x^2} & 0 & \frac{\partial^2\varphi_0}{\partial x\partial z}\\ 0 & 0 & 0\\ \frac{\partial^2\varphi_0}{\partial x\partial z} & 0 & -\frac{\partial^2\varphi_0}{\partial x^2}\end{bmatrix}, \tag{5}$$

or $$E\cdot\nabla E=E_x^2\left[\left(\frac{\partial^2\varphi_0}{\partial x^2}\frac{\partial\varphi_0}{\partial x}+\frac{\partial\varphi_0}{\partial z}\frac{\partial^2\varphi_0}{\partial x\partial z}\right)e_x+\left(\frac{\partial\varphi_0}{\partial x}\frac{\partial^2\varphi_0}{\partial x\partial z}-\frac{\partial\varphi_0}{\partial z}\frac{\partial^2\varphi_0}{\partial x^2}\right)e_z\right], \tag{6}$$

for which we define g(x,z) and h(x,z) such that $$E\cdot\nabla E\equiv E_x(g(x,z)e_x+h(x,z)e_z)^2 \tag{7}$$

The second term in Eq. 7 generally represents dielectrophoretic transport toward the channel surfaces in embodiments of the invention. The first term in Eq. 7 is responsible for dielectrophoretic transport that inhibits, or slows, the motion of particles across a corduroy ridge in embodiments of the invention. The corresponding x-velocity component, $u_{DEP}$, is $$u_{DEP}(x,z)=\mu_{DEP}\ 2\ E_x^2\ g(x,z) \tag{8}$$

In embodiments of the invention where $\int(\partial\phi_0/\partial x)\ dz=1$, then $E_x$ generally describes the mean electric field in the x-direction. This and the y-directed component from Eq. 2, $E_y$, combine as vectors to form the complete mean electric field E, thus $E_x=|E|\cos\theta$, where $\theta$ is the angle the mean field makes to the local normal to the corduroy ridges.

If a particle's dielectrophoresis opposes electrokinesis at any location (x,z), e.g., $$u_{DEP}/u_{EK}=2(\mu_{DEP}/\mu_{EK})|E|\cos\theta\ g(x,z)/(\partial\phi_0/\partial x)<-1 \tag{9}$$

the particle is generally inhibited from crossing the ridge. The ratio $\mu_{DEP}/\mu_{EK}$ is particle specific, thus this inhibition is selective for embodiments of the invention. The inhibition can also be tuned by adjusting the magnitude of the applied field in embodiments of the invention. The inhibition can similarly be tuned by adjusting the incidence angle $\theta$. Finally, the function $g(x,z)/(\partial\phi_0/\partial x)$ depends on the geometry of the ridge, which in some embodiments is set or affected by the method of fabrication. If the depth-wise electric field component introduced by the ridges can be ignored, as is the case in embodiments of the invention, Eq. 9 simplifies to $$2(\mu_{DEP}/\mu_{EK})|E|\cos\theta(\partial^2\phi_0/\partial x^2)<-1 \tag{10}$$

This expression (10) describes how to engineer corduroy microchannels according to embodiments of the present invention that selectively transport particles along the corduroy ridges. Two engineering controls are the local incidence angle of the ridge and the local ridge geometry (that sets $\phi_0$). If the geometry of the ridge (thus $\phi_0$) is fixed, there is a cos $\theta$ dependence of the inhibition threshold. If the geometry of the ridge varies with incidence angle, this relationship may have a more complicated angular dependence. Several embodiments of the present invention have ridge widths that vary with incidence angle. However, in these cases, the field concentrations occur local to an abrupt depth transition, minimizing the influence of the variation in ridge width, so the cos $\theta$ angular dependence is approximately retained.

The theoretical description of the interaction of particles and a ridge or valley is provided to assist those skilled in the art with understanding embodiments of the invention. It is to be understood that many embodiments of the present invention are not completely described by the theory.

Figure 3:
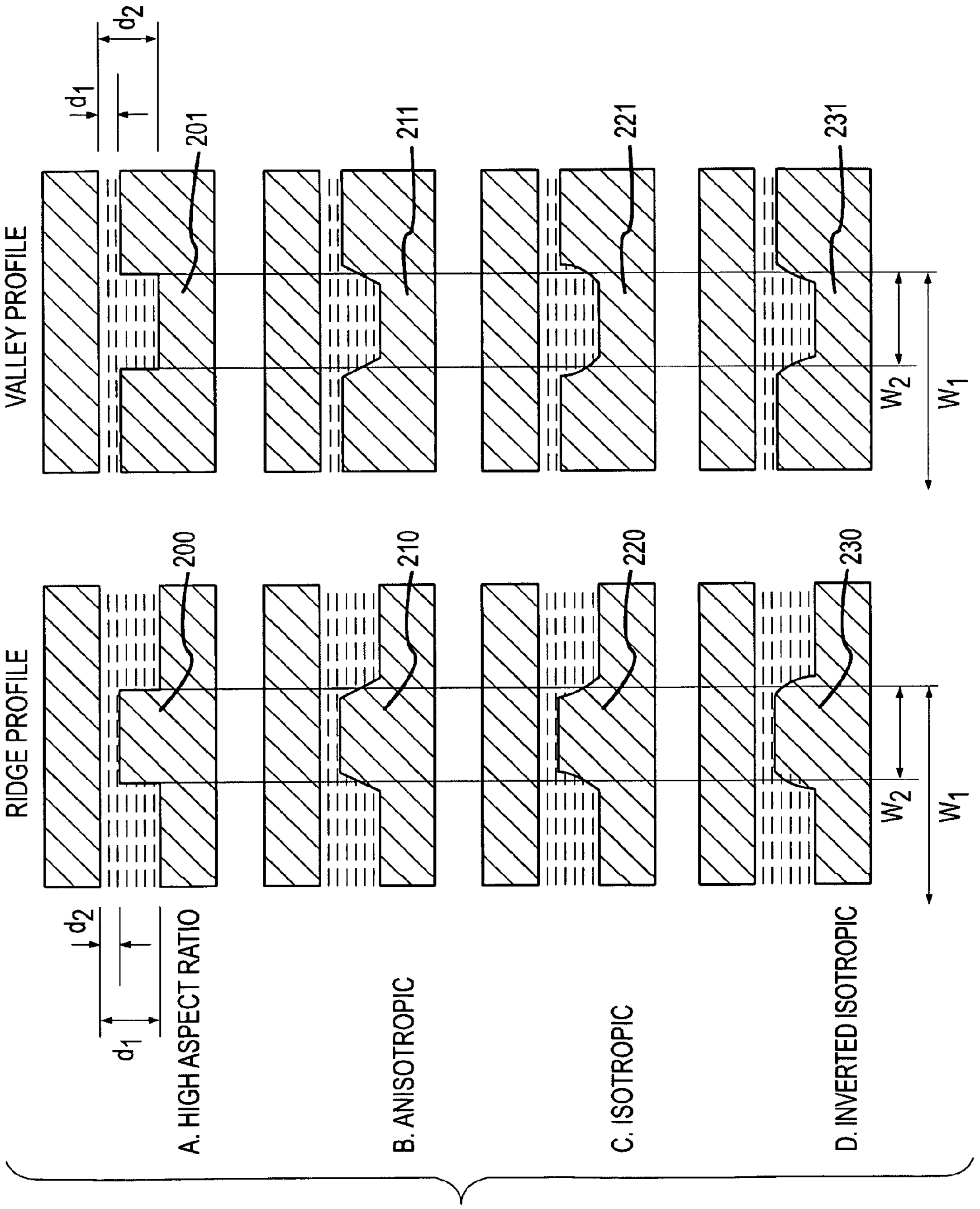
FIG. 3A-D depicts embodiments of ridges according to the present invention.

FIGS. 3A-D depict cross-sections of embodiments of ridges according to the present invention. Examples of both a protruding ridge and a depression are shown. FIG. 3A depicts a cross-section of ridges 200 and 201. The cross-section shown generally represents cross-sections of ridges formed using a high aspect ratio etching procedure, such as reactive ion etching, thick photoresist etching (e.g. SU-8), LIGA, conventional machining and replication technologies such as casting, molding, stamping, embossing, and injection molding. FIG. 3B depicts cross-sections of ridges 210 and 211, which are generally representative of ridges formed during anisotropic low-aspect ratio fabrication techniques such as wet etching in a crystalline substrate or reactive ion etching. FIG. 3C depicts cross-sections of ridges 220 and 221 which are generally representative of ridges fabricated from isotropic etching techniques such as wet etching. FIG. 3D depicts cross-sections of ridges 230 and 231 which are generally representative of ridges formed by replication from a mold or stamp that has a profile like in 220 and 221. As will be appreciated by those skilled in the art, substantially any sidewall shape may be formed. Generally, sharper sidewall features, such as those shown in FIG. 3A produce larger localized electric field concentrations. More gradual sidewall features, such as those shown in FIG. 3D produce broader field concentrations. The particular particle to be manipulated, the tolerable electric field strength, the fluid used, and the voltage to be applied, influence the choice of sidewall shape.

Figure 4:
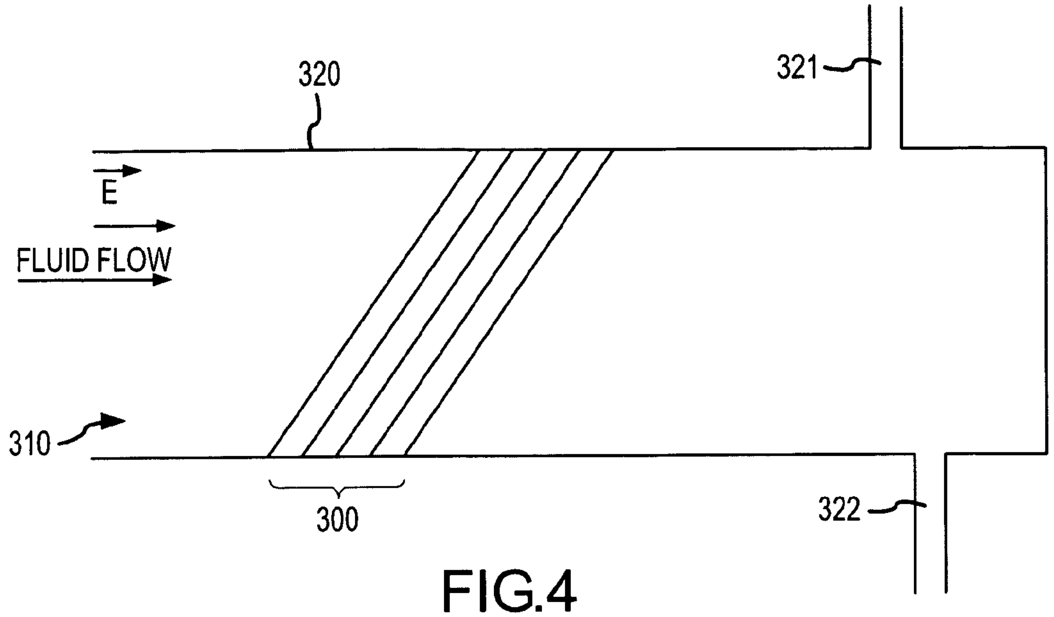
FIG. 4 depicts an embodiment of a particle concentrator according to the present invention.

FIG. 4 depicts an embodiment of a particle concentrator according to the present invention. A plurality of ridges 300 are provided in a channel 310. An electric field is generated across the ridges 300. A fluid sample containing particles flows through the channel 310, and particles are drawn toward a channel wall 320 by dielectrophoretic forces. Some particles will accordingly traverse the channel 310 at an angle. Some particles may be constrained to motion along one or more of the ridges 300. Particles constrained to the ridges 300 may be moved through the channel 310 by reducing the electric field, or cycling the electric field on and off. Accordingly, particles are generally transported toward the channel wall 320. A microchannel or fluid port may be included connected to the channel 310 for removal or transport of the concentrated particle stream, and/or of the filtered particle stream, as generally indicated by channels 321 and 322.

Figure 5:
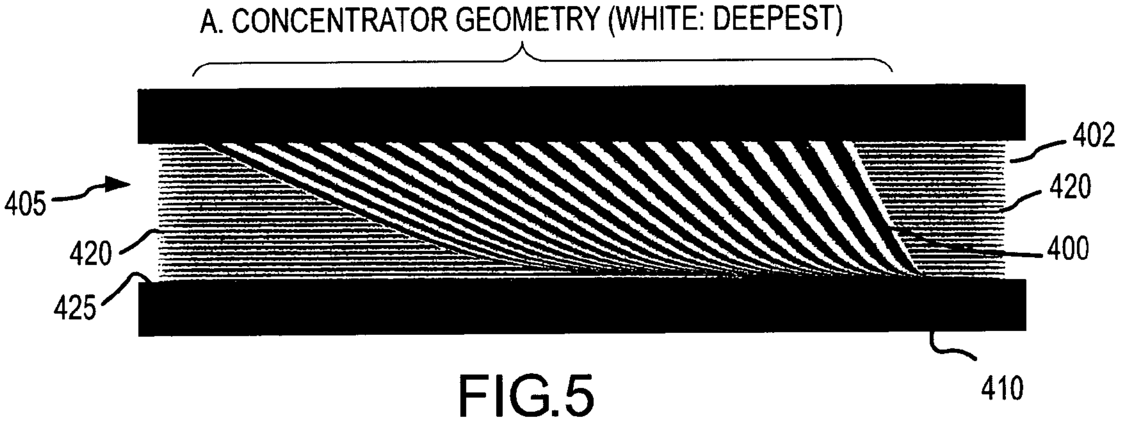
FIG. 5 depicts an embodiment of a particle concentrator according to another embodiment of the present invention.

FIG. 5 depicts an embodiment of a particle concentrator according to another embodiment of the present invention. A plurality of ridges 400 are provided in a channel 402 at an angle to a direction of fluid flow 405. To avoid trapping or immobilizing particles, the ridges 400 are curved toward a concentration region 410. An electric field concentrates particles in the fluid flow 405 toward a wall 425, and in particular, toward the concentration region 410 of the wall 425.

As described previously, to reduce variations in the direction of and magnitude of the average applied electric field across the channel, optional impedance matching ridges 420 are provided upstream and/or downstream of the ridges 400. The impedance matching ridges 420 are preferably oriented substantially parallel to the fluid flow 405. The impedance matching ridges 420 are provided to smooth out the electric field. Generally, the magnitude of the electric field gradient at a first ridge may be greater than that at a neighboring ridge without the presence of the impedance matching ridges 420 and the magnitude and direction of the average electric field will vary throughout the channel. The number and spacing of the impedance matching ridges 420 are determined to have approximately the same surface area in ridges in the region of the channel having impedance matching ridges 420 as having the ridges 400. Accordingly, the electric field gradient encountered by the fluid at a first one of the ridges 420 is more similar to the gradient at a second or later one of the ridges 420 than without the impedance matching ridges 420. To further smooth out the field, the impedance matching ridges 420 may have tapered or wedge-like ends.

Figure 6:
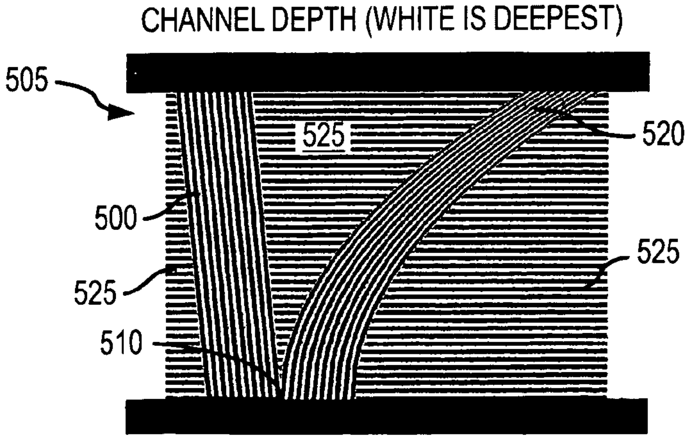
FIG. 6 depicts a particle spectrometer according to an embodiment of the present invention.
Figure 7:
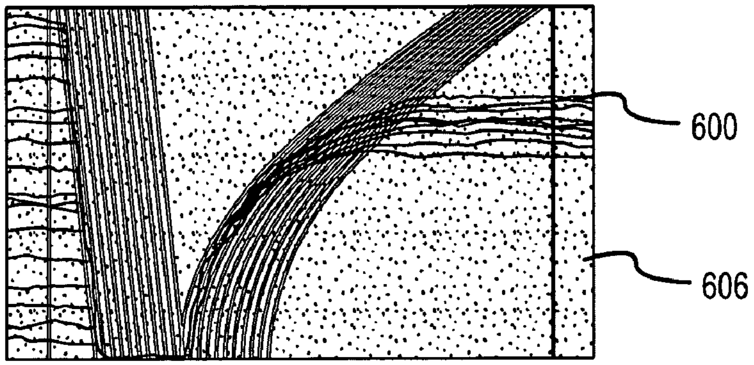
FIG. 7 depicts particles 600 separated spatially in a channel 606 using a particle spectrometer.

FIG. 6 depicts a particle spectrometer according to an embodiment of the present invention. A particle concentrator 500 is provided to concentrate particles at concentration region 510. Although the particle concentrator 500 is in accordance with an embodiment of the invention as described above, any structure for concentrating particles at the concentration region 510 may be used. A particle disperser 520 is further provided in channel 505. The particle disperser 520 includes a plurality of curved ridges, presenting a variety of angles to the particles. At a certain angle, and position within the channel 505, particles with particular dielectrophoretic mobilities will experience less dielectrophoretic force constraining their motion along one or more of the ridges and will proceed into the bulk flow along the channel. FIG. 7 depicts particles 600 separated spatially in a channel 606 using a particle spectrometer as shown in FIG. 6.

Figure 8:
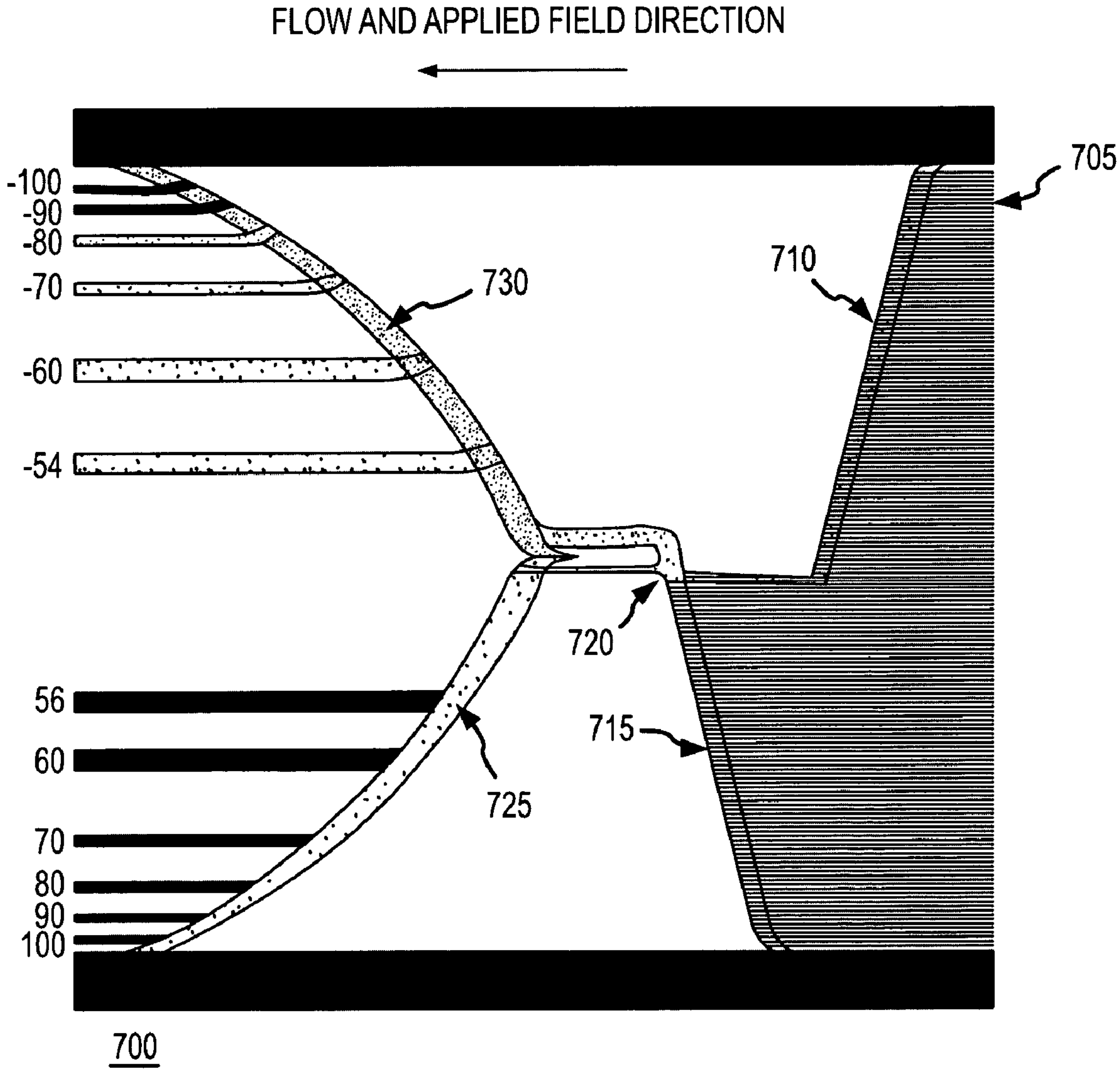
FIG. 8 depicts a particle spectrometer sensitive to dielectrophoretic mobility sign according to an embodiment of the present invention.

Embodiments of spectrometers shown in FIGS. 6 and 7 separate particles according to their dielectrophoretic (DEP) mobility, but do not differentiate particles by the sign of their DEP mobility. In order to perform such a differentiation, one approach is to spatially segregate particles by sign before performing the dispersion. FIG. 8 depicts an embodiment of a spectrometer 700 according to the present invention which is sensitive to the sign of the DEP mobility of particles. The numbers at left in FIG. 8 are proportional to the DEP mobility of the particles in the band. As shown in FIG. 8, a ridge 710 concentrates particles from the upper half of a channel 705. A second ridge 715 concentrates particles from the lower half of the channel 705 and collects particles that spill from the ridge 710. A spur 720 on a trailing edge the ridge 710 releases particles having positive DEP mobility to a positive-branch dispersing ridge 725. Particles having a negative DEP mobility flow along a leading edge of the ridge 715 to a negative-branch dispersing ridge 730. As shown in FIG. 8, the spectrometer 700 does not segregate particles having mobilities in the range $\sim -54 < \mu < \sim 56$ A. U. In other embodiments, other ranges of mobilities are separated, based on the particular design of the dispersing ridges 730 and 725 and/or the collecting ridges 710 and 715.

Figure 9:
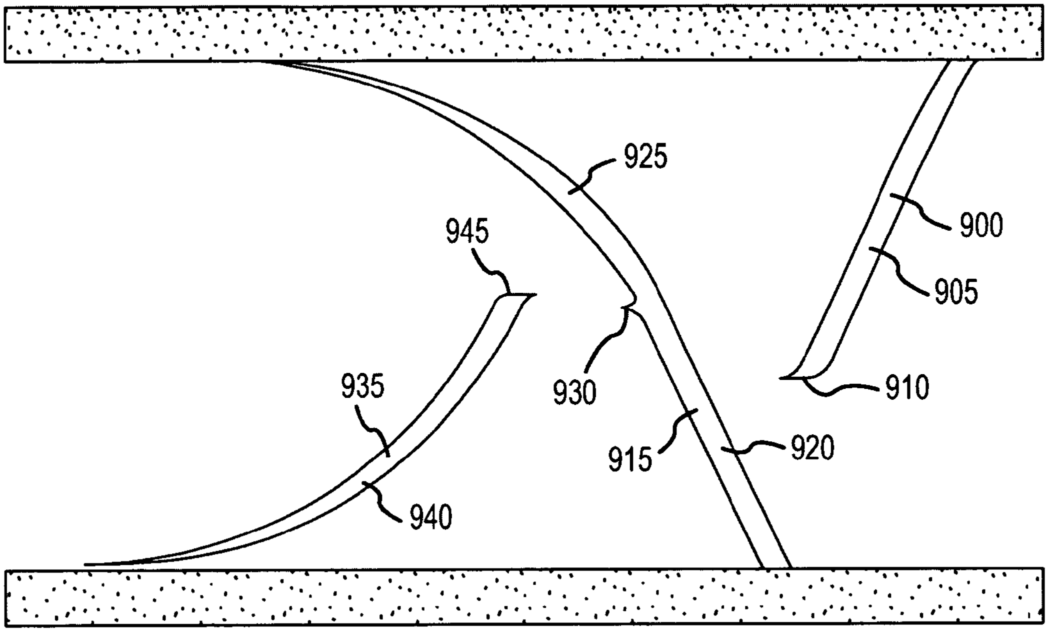
FIG. 9 depicts another embodiment of a particle spectrometer according to the present invention.

FIG. 9 shows another embodiment of a DEP-mobility sign-sensitive particle spectrometer. A leading corduroy ridge 900 concentrates particles over a central section 905, allowing them to spill at a trailing terminus 910. A second corduroy ridge 915 is a compound ridge, as described above, which concentrates particles over part of a central span 920. Particles flowing along a leading edge of the ridge 915 are dispersed in a curved section 925 Particles flowing along a trailing edge of the ridge 915 are released or spilled at a spur 930 on the trailing edge. These particles flow past a third ridge 935 where they are dispersed over a curved section 940. It is also possible to merge the ridge 935 and the compound ridge 915 in the region of the spur 930 and a leading terminus 945 of the ridge 935 to create a lambda-shaped compound ridge.

In some embodiments, particles may be spatially segregated by divergence of the channel walls rather than, or in addition to, the use of a convex ridge curvature. Divergence of the channel walls, in some embodiments, reduces the electric field and consequently the trapping force as particles traverse the system, leading to spatial segregation.

In addition to the specific embodiments shown, it is to be understood that a variety of configurations of ridges may be used for a particular application-combining one or a plurality of ridges, described above, and terminus types, described above, in any combination.

Accordingly, particles may be concentrated or separated during bulk fluid flow using devices and methods of the present invention. This allows, for example, embodiments where a large volume of fluid-pints, liters, or quarts, may be passed through a device and particles within that fluid manipulated. For example, a quantity of water is passed through a device in one embodiment, and the bacteria or other contaminants in the water are removed.

In some embodiments, it is advantageous to limit the distance over which a high electric field is applied, e.g., to reduce the amount of Joule heating. In general, the minimum length of a channel having a simple corduroy concentrator is limited by the minimum ridge incidence angle that avoids clogging and the width of the channel that is needed to obtain the desired volumetric flux of liquid and particles. For high-flow-rate applications, such as screening a water supply, a short-length embodiment is a ratcheting concentrator 800 shown in FIG. 10. The concentrator 800 is operated cyclically. In a collection step a sufficiently high electric field is applied such that particles collect at trailing termini of corduroy ridges, such as a ridge 805. Periodically or occasionally a ratcheting step performed in which particles are moved from the trailing edges substantially back upstream of the fluid flow so they cross an upstream ridge, such as a ridge 810 relative to the ridge 805. This is illustrated by a model particle path 815. The particles can be moved upstream by any combination of 1)reducing and/or reversing the applied electric field, and 2) modulating a mobilization field, as described above.

Figure 10:
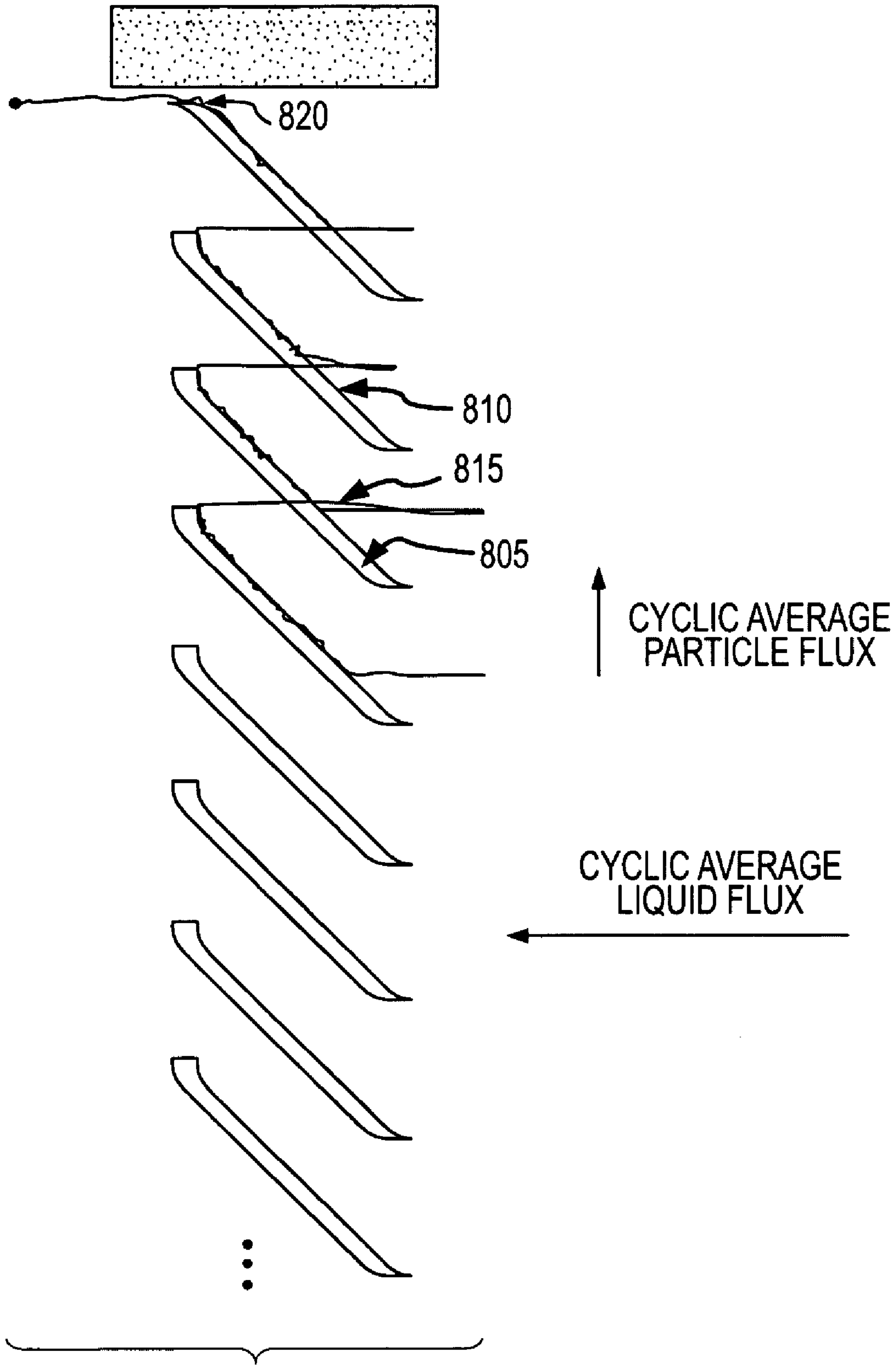
FIG. 10 depicts an embodiment of a ratcheting concentrator according to the present invention.

The system then returns to the collection step and particles which were immobilized on the ridge 805 at the end of the prior collection step become immobilized on the ridge 810. Similarly, particles immobilized on other ridges at the end of the prior collection step become immobilized on an upstream ridge. Because of the tilt and offset of the ridges this cycle produces a net flux in one direction. As shown in FIG. 10, the particles are moved toward a spillway 820. However, other structures may be used for the particles to flow into, for example, another channel or a collection area to immobilize the particles may be used. Particles can then be immobilized and collected or continuously flowed from the end of the ridges as with the simple concentrator. In some embodiments, the ratcheting step and the collection step are performed for approximately equal times, however, in other embodiments the timing of the steps is not equal. For example, in some embodiments the collection step occurs for a longer period of time than the ratcheting step. In other embodiments, the ratcheting step occurs for a longer period of time than the collection step. The number of cycles used depends on the amount of fluid sample being run through the device, the manipulated particles, and the number of ridges, in some embodiments.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A device for manipulating particles in a sample fluid using dielectrophoresis, the device comprising:

a substrate;

an insulating positive ridge on the substrate positioned such that the sample fluid may pass over the positive ridge;

a plurality of electrodes spaced away from the ridge to generate a spatially non-uniform electric field across the insulating ridge.

2. A device according to claim 1, further comprising a plurality of the insulating ridges.

3. A device according to claim 1, wherein the substrate comprises glass.

4. A device according to claim 1, wherein the substrate comprises a polymer.

5. A device according to claim 1, wherein the insulating ridges comprise an insulating material supported by a non-insulating material.

6. A device according to claim 1, further comprising a voltage source connected to the plurality of electrodes.

7. A device according to claim 1, wherein the plurality of ridges on the substrate define a surface of a first fluid channel.

8. A device according to claim 7, further comprising a fluid port connected to the first channel.

9. A device according to claim 7, further comprising a second fluid channel connected to the first fluid channel.

10. A device according to claim 1, wherein the plurality of ridges are each at an angle of between 20 and 80 degrees relative to a direction of fluid flow.

11. A device according to claim 10, further comprising:

a plurality of impedance matching ridges substantially parallel to the direction of fluid flow.

12. A device according to claim 1, wherein the plurality of ridges are each at an angle of about 45 degrees relative to a direction of fluid flow.

13. A device according to claim 1, wherein the plurality of ridges includes a first ridge and a second ridge, said first and second ridges being positioned at different angles relative to a direction of fluid flow.

14. A device according to claim 1, wherein at least one ridge of the plurality of ridges is curved toward a concentration area.

15. A device according to claim 14, further comprising:

a plurality of impedance matching ridges substantially parallel to a direction of fluid flow.

16. A device according to claim 1, wherein the plurality of ridges are curved toward a concentration area.

17. A device according to claim 1, wherein the spatially non-uniform electric field generated across the ridges exerts a dielectrophoretic force on at least one of said particles.

18. A device according to claim 17, wherein said particles comprise particles selected from the group of particles consisting of bacteria, cells, and viruses.

19. A device according to claim 1, wherein the ridge is a positive ridge.

20. A device according to claim 1, wherein non-uniformity in the electric field is generated primarily by the ridge geometry.

21. A device according to claim 1, wherein the electrode is spaced sufficiently away from the ridge such that non-uniformity in the electric field is generated primarily by the ridge geometry.

22. A method for manipulating particles using dielectrophoresis, the method comprising:

generating a spatially non-uniform electric field across an insulating ridge;

passing a sample fluid containing the particles over the insulating ridge, the spatially non-uniform electric field exerting a dielectrophoretic force on the particles thereby constraining motion of at least one particle;

exerting a mobilization force on at least the constrained particle; and transporting at least the constrained particle along the ridge utilizing the mobilization force as the sample fluid continues to pass over the insulating ridge.

23. A method according to claim 22, wherein the mobilization force comprises electrokinetic transport.

24. A method according to claim 22, wherein the mobilization force comprises advection.

25. A method according to claim 22, wherein the mobilization force comprises transporting particles using a gravitational force.

26. A method according to claim 22, wherein the insulating ridges are positioned at an angle with respect to the direction of fluid flow.

27. A method according to claim 22, further comprising transporting the particles to a concentration area.

28. A method according to claim 22, further comprising:

generating a spatially non-uniform electric field across a plurality of insulating ridges including a first ridge and a second ridge, thereby constraining motion of at least a first particle to a region adjacent the first ridge;

changing the spatially non-uniform electric field such that the dielectrophoretic force on the first particle is decreased; and transporting the first particle to the second ridge.

29. A method according to claim 22, wherein the ridge is a positive ridge.

30. A method according to claim 22, wherein the ridge is a negative ridge.

* * * * *